(12) United States Patent
Blodt et al.

(10) Patent No.: US 10,001,398 B2
(45) Date of Patent: Jun. 19, 2018

(54) FILL-LEVEL MEASURING DEVICE AND APPARATUS FOR DETERMINING THE DIELECTRIC CONSTANT

(71) Applicant: Endress + Hauser GmbH + Co. KG, Maulburg (DE)

(72) Inventors: Thomas Blodt, Basel (CH); Peter Klofer, Steinen (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 161 days.

(21) Appl. No.: 14/408,307

(22) PCT Filed: May 29, 2013

(86) PCT No.: PCT/EP2013/061069
§ 371 (c)(1),
(2) Date: Dec. 16, 2014

(87) PCT Pub. No.: WO2013/189707
PCT Pub. Date: Dec. 27, 2013

(65) Prior Publication Data
US 2015/0168202 A1    Jun. 18, 2015

(30) Foreign Application Priority Data
Jun. 18, 2012  (DE) .................. 10 2012 105 281

(51) Int. Cl.
*G01F 23/284*    (2006.01)
*G01F 23/00*     (2006.01)
*G01F 23/296*    (2006.01)

(52) U.S. Cl.
CPC ........ *G01F 23/284* (2013.01); *G01F 23/0076* (2013.01); *G01F 23/296* (2013.01); *G01F 23/2962* (2013.01)

(58) Field of Classification Search
CPC ............... G01F 23/0076; G01F 23/296; G01F 23/2962; G01F 23/284
See application file for complete search history.

(56) References Cited

U.S. PATENT DOCUMENTS 3,474,337 A * 10/1969 Petrick .................. G01F 23/284
                                                              324/644
3,812,422 A *  5/1974 De Carolis ........... G01F 23/284
                                                              324/642

(Continued)

FOREIGN PATENT DOCUMENTS

CN   101438175 A   5/2009
DE   10136754 A1   2/2003

(Continued)

OTHER PUBLICATIONS

English Translation of the International Preliminary Report on Patentability, WIPO, Geneva, dated Dec. 31, 2014.

(Continued)

*Primary Examiner* — Hezron E Williams
*Assistant Examiner* — Marrit Eyassu
(74) *Attorney, Agent, or Firm* — Bacon & Thomas, PLLC

(57) ABSTRACT

A fill-level measuring device for determining the fill level of a process medium in a container by means of a travel-time method. The fill-level measuring device is distinguished by features including that the fill-level measuring device has structure for determining the dielectric constant of a second medium, which is located between the measuring device and the process medium. The structure for determining the dielectric constant comprises at least one waveguide for a high-frequency measuring signal, wherein such waveguide is filled at least sectionally with a dielectric and embodied and arrangeable in such a manner that the dielectric forms with the second medium an interface, at which a significant fraction of the measuring signal supplied to the second (Continued)

medium via the waveguide is reflected. Furthermore, an apparatus for determining the dielectric constant and a system of such an apparatus and a fill-level measuring device are proposed.

8 Claims, 2 Drawing Sheets

(56) References Cited

U.S. PATENT DOCUMENTS

| | | | |
|---|---|---|---|
| 4,833,918 A | 5/1989 | Jean | |
| 5,400,651 A * | 3/1995 | Welch | G01F 23/284 324/643 |
| 5,811,677 A * | 9/1998 | Cournanc | G01F 23/284 73/291 |
| 5,898,308 A * | 4/1999 | Champion | G01F 23/284 324/642 |
| 6,121,780 A * | 9/2000 | Cruickshank | G01F 23/284 324/637 |
| 6,198,424 B1 * | 3/2001 | Diede | G01F 23/284 324/637 |
| 7,367,231 B1 * | 5/2008 | Fauveau | G01F 23/26 73/304 C |
| 7,679,374 B2 | 3/2010 | Bromberg | |
| 2001/0050629 A1 * | 12/2001 | Benway | G01F 23/284 342/124 |
| 2002/0143500 A1 * | 10/2002 | Diede | G01N 22/00 702/189 |
| 2002/0177961 A1 * | 11/2002 | Lovegren | G01N 22/00 702/50 |
| 2004/0183718 A1 * | 9/2004 | Hagg | G01F 23/284 342/124 |
| 2005/0083062 A1 * | 4/2005 | Couch | G01F 23/284 324/337 |
| 2007/0139256 A1 * | 6/2007 | Edvardsson | G01F 23/284 342/124 |
| 2008/0295609 A1 * | 12/2008 | Xie | G01F 1/663 73/861.25 |
| 2009/0158839 A1 * | 6/2009 | Spanke | G01F 23/284 73/290 V |
| 2009/0178478 A1 * | 7/2009 | Reimelt | G01F 23/284 73/290 V |
| 2009/0204346 A1 | 8/2009 | Xie | |
| 2009/0302867 A1 * | 12/2009 | Schroth | G01F 23/284 324/642 |
| 2011/0094299 A1 * | 4/2011 | Muller | G01F 23/0076 73/290 V |
| 2012/0324994 A1 * | 12/2012 | Welle | G01F 23/2962 73/290 V |

FOREIGN PATENT DOCUMENTS

| | | |
|---|---|---|
| DE | 102009002785 A1 | 11/2010 |
| DE | 102010040262 A1 | 3/2012 |
| EP | 1191315 A2 | 3/2002 |
| GB | 2110377 A | 6/1983 |
| GB | 2194340 A | 3/1988 |
| WO | 9942794 A1 | 8/1999 |
| WO | 0043739 A1 | 7/2000 |
| WO | 2007130896 A2 | 11/2007 |

OTHER PUBLICATIONS

German Search Report, German PTO, Munich, dated Mar. 21, 2013.
International Search Report, EPO, The Netherlands, dated Sep. 26, 2013.

* cited by examiner

FILL-LEVEL MEASURING DEVICE AND APPARATUS FOR DETERMINING THE DIELECTRIC CONSTANT

TECHNICAL FIELD

The present invention relates to a fill-level measuring device for determining the fill level of a process medium in a container by means of a travel-time method. The process medium is, for example, a liquid. Furthermore, the invention relates to an apparatus for determining the dielectric constant of a medium in a container, comprising a waveguide for a high-frequency measurement signal and an electronics unit. The medium is, for example, a liquid, a gas or a foam.

BACKGROUND DISCUSSION

For fill level measurement of fluids or bulk goods in containers, measuring devices are used, which determine fill level using a travel-time method. Examples of such devices include radar measuring devices. Such measuring devices use a microwave signal, which is radiated, for example via a horn antenna, toward the medium to be detected. The signal reflected on the medium is evaluated in the measuring device by an electronics unit. Determinable from the travel time of the signal is the distance to the medium and therefrom the fill level of the medium. Known are pulse radar systems and continuously radiating radar systems. In the case of so-called TDR probes, the signal is guided along a signal line protruding into the medium. An additional measuring device, which works according to the travel time principle, is an ultrasonic measuring device, which ascertains the distance to the medium by means of an ultrasonic signal.

In the case of fill level measurement by means of a travel-time method, measurement inaccuracies can occur, when, above the process medium, whose fill level is to be detected, instead of air, vacuum or some other medium of very low relative dielectric constant, another medium is present, for example, a gas phase, since this affects the travel time of the signal. It would be, consequently, advantageous to know the medium located between the measuring device and the process medium to be detected. At least the dielectric constant of the medium should be known.

Known from (laid open application) Offenlegungsschrift DE 102006045711 A1 is a method for distinguishing different fill materials by means of microwave measurement. For this, microwaves are radiated toward the medium to be examined and evaluated by a spatially remote sensor.

SUMMARY OF THE INVENTION

An object of the invention is to increase the accuracy of a fill level measuring device determining fill level by means of a travel-time method. Furthermore, it is an object of the invention to provide a compact apparatus for determining the dielectric constant of a medium.

The object is achieved by a fill-level measuring device for determining the fill level of a process medium in a container by means of a travel-time method, wherein the fill-level measuring device has means for determining the dielectric constant of a second medium, which is located between the fill-level measuring device and the process medium, wherein the means for determining the dielectric constant comprises at least one waveguide for a high-frequency measuring signal, wherein such waveguide is filled at least sectionally with a dielectric and embodied and arrangeable in such a manner that the dielectric forms with the second medium an interface, at which a significant part of the measuring signal supplied to the second medium via the waveguide is reflected. The waveguide is, for example, a hollow conductor or a coaxial probe.

In a first embodiment of the fill level measuring device, an electronics unit is provided, which is embodied, based on the travel time of a signal transmitted toward the process medium and reflected on the process medium, to determine a measured value for the fill level, and to ascertain as a function of the measured dielectric constant of the second medium a corrected measured value for the fill level. A correction is required, when the medium is different from air, since the travel time of the fill level measuring signal depends on the dielectric constant of the medium, respectively the media, traveled through. Examples of application include gas phases, which form at high process temperatures, and dust-containing atmospheres. The changed dielectric constant is reliably detectable by the supplemental means for dielectric constant determination, so that suitable correction of the fill level measured value is enabled.

In a further development, furnished in the electronics unit is at least one correction value and/or a correction formula for correction of the measured value for the fill level as a function of the dielectric constant of the second medium, and the electronics unit is embodied to correct the measured value for the fill level in accordance with the correction value and/or the correction formula.

In an embodiment, the fill-level measuring device is embodied as an ultrasonic measuring device, a radar measuring device with guided signal or a radar measuring device utilizing freely propagating waves.

By means of the apparatus for determining the dielectric constant, the accuracy of measurement of the fill level measuring device is increasable, in that the information concerning the dielectric constant is taken into consideration in determining the fill level. A fill-level measuring device working according to the travel-time method is embodied to transmit a signal in the direction of the process medium and to receive and to evaluate the reflected signal. The fill-level measuring device is arranged spaced from the process medium. In any event, in the case of a radar measuring device with guided wave, there is contact via the waveguide. The transmitting and receiving element for transmitting the signal and receiving the reflected signal is, however, nevertheless arranged at a certain distance from the process medium. In contrast to this, there exists direct contact between the medium, whose dielectric constant is to be determined, and the waveguide for the high-frequency measuring signal for determining the dielectric constant. The high-frequency measuring signal, preferably a microwave signal, is not radiated into the medium, but, instead, reflected at the interface with the medium. The waveguide and the dielectric are, consequently, in contrast to the components of the fill level measuring device serving for fill level measurement, not embodied to radiate the measuring signal with as low as possible loss into the medium, but, instead, rather embodied in such a manner that the measuring signal is reflected at the interface. Advantageous embodiments provide an as low as possible loss propagation of the measuring signal in the waveguide or an as low as possible loss reflection at the interface.

The object is further achieved by an apparatus for determining the dielectric constant of a medium in a container, comprising a waveguide for a high-frequency measuring signal and an electronics unit, wherein the waveguide is filled at least sectionally with a dielectric and embodied in such a manner and introducible into the container such that the dielectric forms with the medium an interface, at which a significant part of the measuring signal propagating in the waveguide toward the medium is reflected and wherein the electronics unit is embodied to receive the signal reflected at the interface and to evaluate such at least with reference to amplitude.

Since the reflectivity depends on the dielectric constant of the medium adjoining the interface, the amplitude of the reflected signal is a measure for the dielectric constant. The dielectric is present preferably in the form of a solid and forms thus a defined interface to the medium. The apparatus of the invention represents a non-invasive means for determining the dielectric constant. Furthermore, the apparatus is compact, since a waveguide with very small dimensions is sufficient for measuring. The apparatus can, thus, also be introduced into the container via a process connection having a small diameter.

In a first embodiment, the electronics unit compares the amplitude of the measuring signal with the amplitude of the reflected signal and determines the dielectric constant of the medium from the ratio of the amplitudes. In other words, the electronics unit is embodied to ascertain the dielectric constant from the energy ratio of incoming and outgoing waves.

In an embodiment, the dielectric has a frustoconically shaped end. Preferably, the frustoconical-shaped end is rotationally symmetric. Through such a forming, the fraction of the transmitted power is lessened.

In an additional embodiment, at least one cooling fin is formed on the apparatus. Preferably, the waveguide has one or more cooling fins on its outside facing away from the dielectric. This protects the electronics unit from high process temperatures.

In an embodiment, the waveguide is embodied as a hollow conductor or as a coaxial conductor. For example, the waveguide is embodied as a round, hollow conductor.

Furthermore, the object is achieved by a system for determining a fill level of a process medium in a container, at least comprising a fill-level measuring device for determining the fill level of the process medium by means of a travel-time method and an apparatus for determining the dielectric constant of a second medium, which is located between the process medium and the fill-level measuring device, wherein the apparatus is embodied as earlier described.

BRIEF DESCRIPTION OF THE DRAWINGS

The invention will now be explained in greater detail based on the appended drawing, the figures of which show schematically as follows.

DETAILED DISCUSSION IN CONJUNCTION WITH THE DRAWINGS

Figure 1:
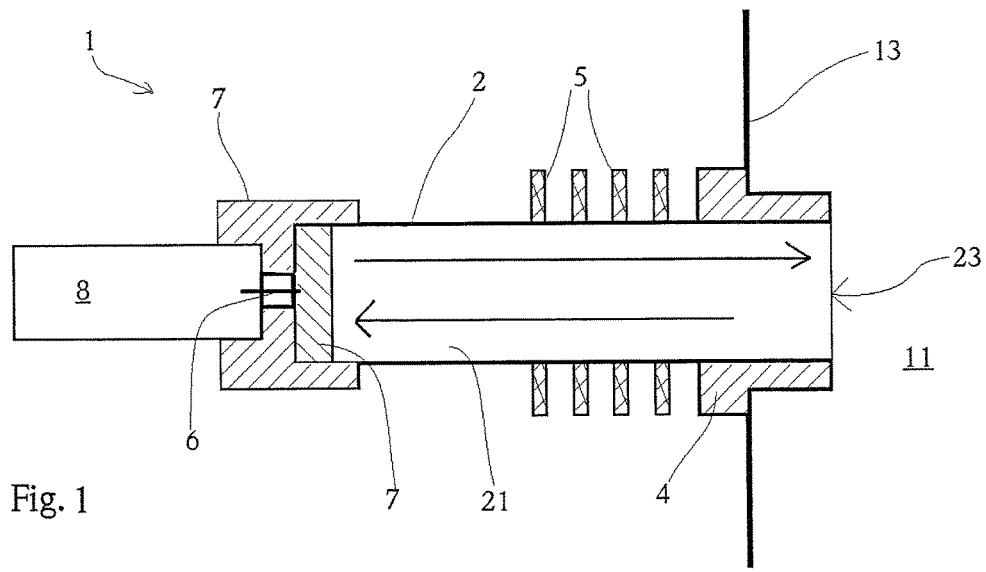
FIG. 1 is a section of an apparatus for determining the dielectric constant according to a first embodiment.

FIG. 1 shows an apparatus 1 for determining the dielectric constant of a medium 11 located in a container 12. The apparatus 1 is mounted in the wall 13 of the container 12. For this, the apparatus 1 includes a process connection 4, for example, a flange or a screw-in mount. Medium 11 is preferably a gas phase, steam or a dusty atmosphere, i.e. a particle-containing gas.

An essential component of the apparatus is a waveguide 2 for a high-frequency measuring signal. The terminology, high-frequency signal, means a signal in the microwave region, especially in the GHz range, for example, having a frequency between 6 GHz and 77 GHz, especially 26 GHz. Waveguide 2 is embodied as a hollow conductor, for example, one with a round or rectangular cross section, and is filled with a solid dielectric 21. Especially suitable is a dielectric 21, which only slightly attenuates the high-frequency waves propagating in the waveguide 2, for example, PTFE, ETFE, PEEK or PE. The apparatus 1, respectively the waveguide 2, is arranged in such a manner that the waveguide 2 is in contact with the medium 11 located in the container via an interface 23. The dielectric 21 can protrude into the container, terminate at least essentially flush with the container wall 13 or be set back.

Instead of the hollow conductor, also a coaxial probe can serve as waveguide. Preferably, the inner conductor of the coaxial probe ends back from the interface 23 by at least a few millimeters, so that the structure cannot cause explosions. The dimensions of the waveguide 2 can be small, so that the apparatus 1 claims little space in the wall 13. The dimensions depend, in such case, on the frequency of the measuring signal and are inversely proportional to the frequency. For example, the diameter of the waveguide 2 at a frequency of 6 GHz amounts preferably to about 40 mm, while the diameter in the case of 26 GHz lies preferably between 5 mm and 12 mm. The length in the case of 26 GHz lies, for example, between 15 mm and 40 mm. In principle, the length can, however, almost be as long as desired, wherein a smaller length leads to smaller power losses.

Dielectric 21 forms a defined interface 23 with the medium 11, whose dielectric constant is to be determined. At the interface 23, there is direct contact between dielectric 21 and medium 11. In an embodiment, the medium-contacting surface of the dielectric material 21 is provided with a process isolating layer, for example, in the form of a thin coating. Interface 23 can be planar or have some other suitable shape, so that an as large as possible fraction of the measuring signal is reflected and an as small as possible fraction is transmitted into the medium 11. The smaller the transmission, the more exact is the determining of the dielectric constant, since less undesired reflections occur within the container 12, which might be fed back into the waveguide 2.

Formed on the waveguide 2 are a number of cooling fins 5. These serve for the thermal decoupling of the apparatus 1, especially the electronics unit 8, which adjoins the waveguide 2, from the process. Alternatively or supplementally, a thermal decoupling can be provided over a significant length of the waveguide 2.

The measuring signal is produced in the electronics unit 8 and fed via a guide 6 to a coupling element 7, which in-couples the measuring signal into the waveguide 2. The electronics unit 8 receives the reflected measuring signal via the same elements. The electronics unit 8, which is presented here only schematically, will be explored in greater detail with reference to FIG. 2.

Figure 2:
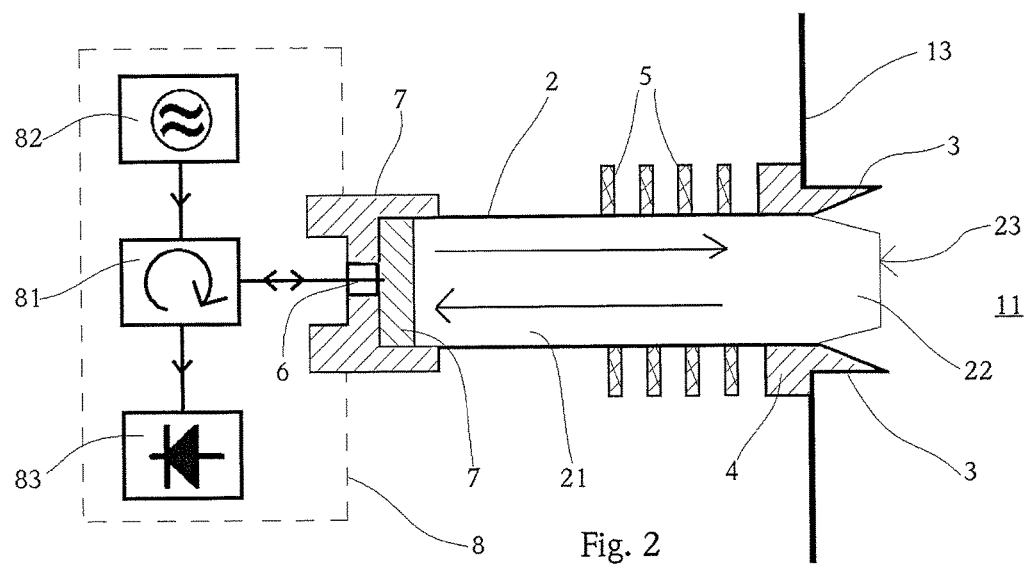
FIG. 2 is a section of an apparatus for determining the dielectric constant according to a second embodiment, with electronics unit.

FIG. 2 discloses an advantageous embodiment of the waveguide 2 filled with the dielectric 21. Waveguide 2 can again be constructed as a hollow conductor or a coaxial probe and is not limited to a circular cross sectional area. Dielectric 21 is embodied in such a manner that the transmitted fraction of the measuring signal is minimized. For this, the dielectric 21 has a frustoconically shaped end 22. The surface of the end 22 forms, in such case, the interface 23 to the medium 11. Preferably, end 22 is rotationally symmetric. Furthermore, the end 22 is surrounded by a funnel 3, which is preferably likewise rotationally symmetric. Funnel 3 is metallic. End 22 and funnel 3 extend into the interior of the container 12 bounded by the wall 13.

In a variant of this embodiment, the dielectric 21 protrudes further into the container 12, so that not only the frustoconically shaped end 22 is located within the container 12. In another variant, end 22 is set back, so that the end 22 protrudes only partially inwardly into the container 12. Furthermore, another variant is that in which the interface 23 of the dielectric material 21 is essentially flush with the container wall 13, i.e. waveguide 2 and dielectric 21 do not protrude into the container interior. Also, the funnel 3 is located in this variant outside of the container 12. Preferably in this variant, the funnel 3 forms simultaneously the process connection 4 for securement of the apparatus 1 in the wall 13.

The other explanations hold generally for an apparatus 1 of the invention for determining the dielectric constant and are not limited to the illustrated embodiment of the waveguide 2 and the dielectric material 21.

The end region of the waveguide 2 facing away from the medium 11 is connected via connecting means with the electronics unit 8. The connecting means comprise at least one coupling element 7 and a traversing guide 6. The coupling element 7 couples the measuring signal into the waveguide 2 and the reflected measuring signal from the waveguide 2. From explosion protection reasons, a gas-sealed and high-frequency transmissive guide 6 is used, by which the measuring signal is brought from the electronics unit 8 into the coupling element 7 and the reflected measuring signal from the coupling element 7 into the electronics unit 8. Traversing guide 6 is comprised, for example, of glass with a cable as carrier for the measuring signal. The transition to the hollow conductor is provided by the coupling element 7.

Electronics unit 8 includes a high frequency oscillator 82 or, alternatively, another suitable high frequency source for producing the high-frequency measuring signal. The measuring signal is fed to a so-called duplexer 81. Duplexer 81 serves as a transmitting/receiving separator, or directional coupler. Duplexer 81 leads the measuring signal to the waveguide 2, respectively to the guide 6 and the reflected measuring signal to a detector 83. Duplexer 81 is embodied, for example, as a circulator or as a combination of a coupler and a matched connection, wherein the latter embodiment can also be implemented in hollow conductor technology. Another form of embodiment in hollow conductor technology is a so called magic T. Such is arrangeable directly behind the waveguide 2, so that the coupling element 7 and the guide 6 can be omitted.

Detector 83 is embodied to determine the amplitude of the signal supplied to it. Preferably, detector 83 compares the measured amplitude of the reflected measuring signal with the amplitude of the transmitted measuring signal and ascertains therefrom the fraction of the measuring signal reflected on the interface 23 with the medium 11. The reflected power is dependent in known manner on the dielectric constant of the dielectric material 21 and that of the medium 11. Since the first is known, the dielectric constant of the medium 11 is ascertainable from the reflected measuring signal.

Detector 83 can in an advantageous embodiment, for example, be temperature compensated by means of a neighboring temperature sensor or it can be operated at a predeterminable temperature, whereby the accuracy of measurement in the determining of the dielectric constant is increased.

For protecting the electronics unit 8 against high process temperatures, the sensor components, i.e. the waveguide 2, the dielectric 21, in given cases, the funnel 3 and the process connection 4, can be separated from the duplexer 81. The connection between the sensor components and the duplexer 81 occurs, for example, via a cable. With increasing length of the cable, the accuracy of measurement lessens, however.

The measuring signal can be produced continuously or as pulses. For example, it is a sinusoidal or a rectangular signal.

Not shown is an evaluation unit, which determines the dielectric constant from the measured amplitude ratio. The evaluation unit is preferably digitally embodied, for example, as a microcontroller. Preferably furnished in a memory of the evaluation unit in the form a table or a formula is a relationship between amplitude ratio and dielectric constant.

In an additional embodiment (not shown), a relative reflection factor is determined, instead of the absolute reflection factor. For this, the apparatus 1 includes a reference element, which is embodied equally to the waveguide 2 with the dielectric 21, but, instead of the interface with the medium 11 has an interface with a reference medium of known dielectric constant, for example, a reference gas. The evaluation unit compares the amplitude of the reflected measuring signal with the amplitude of the reflected reference signal and determines based on the ratio the dielectric constant of the medium 11.

Figure 3:
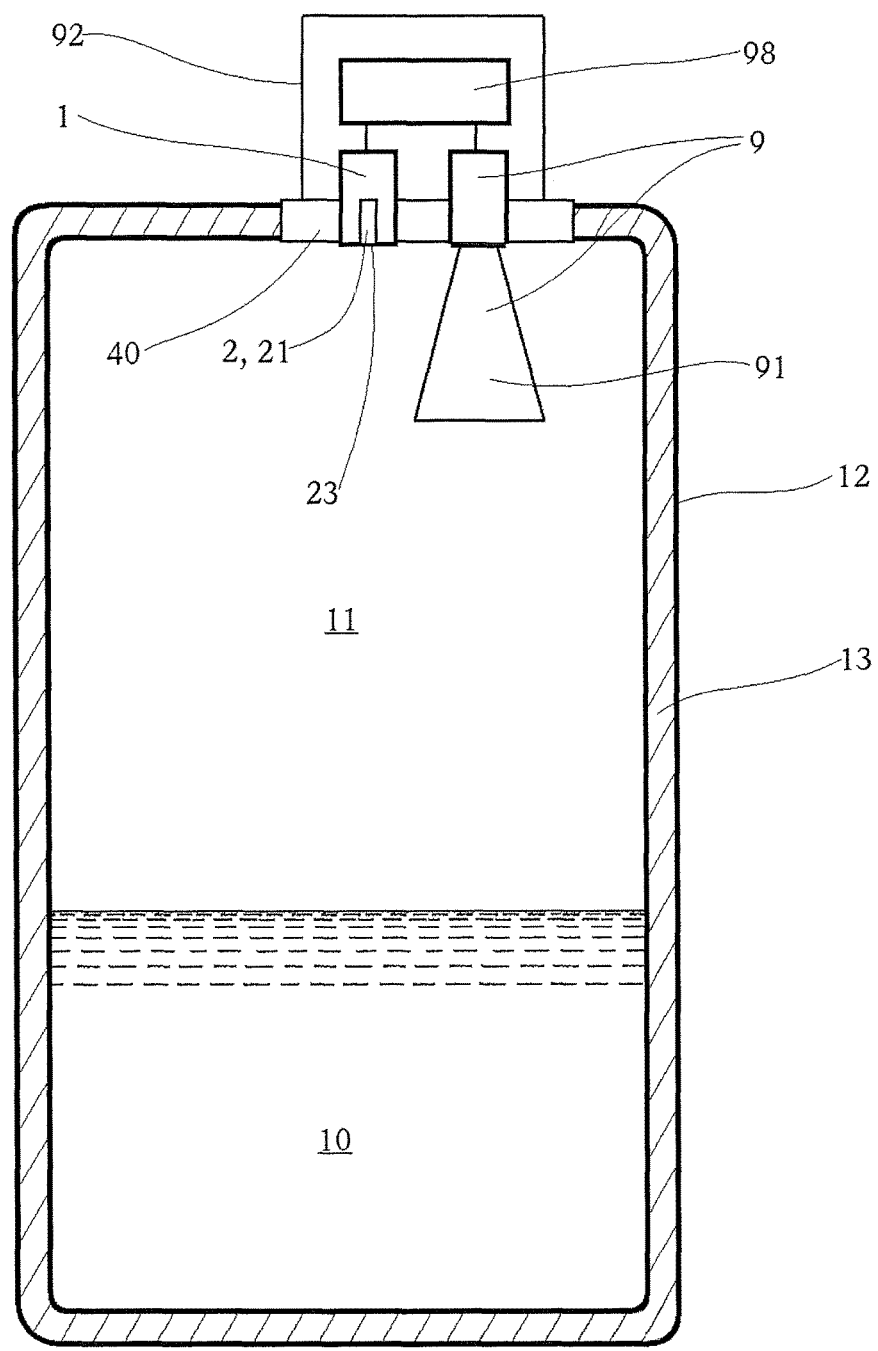
FIG. 3 is a system composed of a measuring device for fill level measurement and an apparatus for determining the dielectric constant.

FIG. 3 shows a system composed of a fill-level measuring device 9 and an apparatus 1 for determining the dielectric constant. The fill-level measuring device 9 and the apparatus 1 for determining the dielectric constant are preferably arranged neighboring one another on or in the same container 12. The fill-level measuring device 9 determines fill level of the process medium 10 by means of a travel-time method. It sends via an antenna 91 a signal toward the process medium 10 and receives the signal reflected on the surface of the process medium 10. From the signal travel time, the fill-level measuring device 9 ascertains the distance to the process medium 10, from which, in the case of known container geometry, fill level is determinable. The accuracy of determining fill level is increased with the assistance of the apparatus 1 for determining the dielectric constant of the medium 11 located above the process medium 10.

The fill-level measuring device 9 can be embodied, for example, as an ultrasonic measuring device or as a radar measuring device, wherein the radar measuring device is not limited to the shown variant with a horn antenna 91.

By means of the apparatus 1 for determining the dielectric constant of an adjoining medium 11, it is detectable whether between the fill-level measuring device 9 and the process medium 10 air or some other medium is present. Furthermore, the medium 11 is specifiable based on the dielectric constant. Especially, a gas phase 11 of the process medium 10 is recognizable. A gas phase 11 forms frequently at high process temperatures. Through knowledge of the dielectric constant of the medium 11 present between the fill-level measuring device 9 and the process medium 10, changes in the propagation velocity of the signal for fill level measurement compared with propagation in air can be taken into consideration in determining the fill level. This enables an especially exact and reliable determining of the fill level.

The system can also include a plurality of apparatuses 1 for determining the dielectric constant and arranged at different heights in the container 12. For example, this system variant can detect foam on the surface of the process medium 10 but not reaching the container lid, where the fill-level measuring device 9 is usually mounted.

The system further includes a superordinated electronics unit 98. Electronics unit 98 receives the measured value for the fill level and the measured value for the dielectric constant and is embodied in such a manner that it calculates by means of the measured value for the dielectric constant a compensated fill level value from the fill level value supplied to it. In another variant, the information concerning the dielectric constant of the medium 11 located between the fill-level measuring device 9 and the process medium 10 is provided to the fill-level measuring device 9. For example, the apparatus 1 and the fill-level measuring device 9 are connected with one another via a data line or the apparatus 1 transmits its measurement data wirelessly to the fill-level measuring device 9.

In an advantageous embodiment of the system, such as shown, the apparatus 1 for determining the dielectric constant and the fill-level measuring device 9 are mounted in a shared flange 40. Electronics unit 98 is connected with the two measuring devices 1, 9. A housing 92 protects the electronics unit 98 from the environment. The two measuring devices 1, 9 in this embodiment need not have their own protective housings, since at least the electronic components are located within the housing 92.

Alternatively to forming a system of fill-level measuring device 9 and apparatus 1 for determining the dielectric constant of an adjoining medium 11, the accuracy of a fill level measuring device 9 based on a travel-time method can also be improved by embodying the fill-level measuring device 9 in such a manner that it includes means for determining the dielectric constant. In such case, the apparatus 1 can be integrated into the fill-level measuring device 9, for example, introducing an independent apparatus 1 for determining the dielectric constant into the housing of the fill level measuring device 9 and providing the electronics unit of the fill level measuring device 9 with the measured value for the dielectric constant.

In another variant, only the detector for detecting the reflected measuring signal is placed supplementally in the housing of the fill level measuring device 9. A shared signal producing unit produces the measuring signal for ascertaining the dielectric constant and the signal for the fill level measurement, conducts them into a shared hollow conductor 2 filled with a dielectric 21 and a shared electronics unit 98 evaluates the signals for the fill level and the measuring signals for the dielectric constant and determines the fill level of the process medium 10 taking into consideration the dielectric constant of the medium 11. This embodiment is an option, when the fill-level measuring device 9 already has a suitable waveguide 2, which is filled with a dielectric 21, and can be used equally for signals for the fill level measurement and for the dielectric constant measurement. Such an embodiment is especially advantageous, since the accuracy the fill level measurement can be increased with only a few additional components.

In another embodiment, a separate waveguide 2 is introduced into the fill-level measuring device 9 for measuring the dielectric constant of the adjoining medium 11. In an embodiment, the fill-level measuring device 9 has, further, two separate signal producing units, one for the signal for fill level measurement and one for the measuring signal for dielectric constant. As a function of the embodiment of the fill-level measuring device 9, especially in reference to its susceptibility to disturbance signals, the measuring signal can be produced with the same frequency as the signal for fill level measurement. If a measuring with the same frequencies is not possible, the two signals can be produced with frequencies differing from one another, even with frequencies differing only slightly from one another, for example, by 5%. The measuring of the fill level and the measuring of the dielectric constant can occur at the same time or alternately.

The invention claimed is:

1. A fill-level measuring device for determining the fill level of a process medium in a container by means of a travel-time method, comprising:
    means for determining the dielectric constant of an atmosphere above the process medium, which is located between the fill-level measuring device and the process medium, said means for determining the dielectric constant comprises at least one waveguide for a high-frequency measuring signal, said waveguide is filled at least sectionally with a dielectric and embodied and arrangeable in such a manner that the dielectric forms with the atmosphere an interface, at which a fraction of the measuring signal supplied to the atmosphere via the waveguide is reflected, wherein the dielectric constant of the atmosphere is ascertained by comparing the amplitude of the measuring signal with the amplitude of the reflected signal, and determining the dielectric constant of the atmosphere from the ratio of the amplitudes; and
    at least one electronics unit, which is embodied, based on a signal transmitted toward the process medium and reflected on the process medium to determine a measured value for the fill level, and to ascertain as a function of the measured dielectric constant of the atmosphere above the process medium, a corrected measured value for the fill level.

2. The fill-level measuring device as claimed in claim 1, wherein:
    there is furnished in said electronics unit at least one correction value and/or a correction formula for correction of the measured value for the fill level as a function of the dielectric constant of the atmosphere; and
    said electronics unit is embodied to correct the measured value for the fill level in accordance with the correction value and/or the correction formula.

3. The fill-level measuring device as claimed in claim 1, wherein:
    the fill-level measuring device is embodied as an ultrasonic measuring device, a radar measuring device with guided signal or a radar measuring device utilizing freely propagating waves.

4. An apparatus for determining the dielectric constant of a medium in a container, comprising:
    a waveguide for a high-frequency measuring signal; and
    an electronics unit, wherein:
    said waveguide is filled at least sectionally with a dielectric and embodied in such a manner and introducible into the container such that the dielectric forms with the medium an interface, at which a significant fraction of the measuring signal propagating in said waveguide toward the medium is reflected; and
    said electronics unit is embodied to receive the signal reflected on said interface and to compare the amplitude of the measuring signal with the amplitude of the reflected signal, and to determine the dielectric constant of the medium from the ratio of the amplitudes.

5. The apparatus as claimed in claim 4, wherein:
    the dielectric has a frustoconically shaped end.

6. The apparatus as claimed in claim 4, wherein:
at least one cooling fin is formed on the apparatus.

7. The apparatus as claimed in claim 4, wherein:
said waveguide is embodied as a hollow conductor or as a coaxial conductor.

8. A system for determining a fill level of a process medium in a container, at least comprising:
a fill-level measuring device for determining the fill level of the process medium by means of a travel-time method; and
at least one apparatus for determining the dielectric constant of a medium in a container, comprising: a waveguide for a high-frequency measuring signal; and an electronics unit, wherein: said waveguide is filled at least sectionally with a dielectric and embodied in such a manner and introducible into the container such that the dielectric forms with the medium an interface, at which a significant fraction of the measuring signal propagating in said waveguide toward the medium is reflected; and said electronics unit is embodied to receive the signal reflected on said interface and to compare the amplitude of the measuring signal with the amplitude of the reflected signal, and to determine the dielectric constant of the medium from the ratio of the amplitudes.

* * * * *